United States Patent
Horvath et al.

(10) Patent No.: US 7,159,578 B2
(45) Date of Patent: Jan. 9, 2007

(54) FUEL DELIVERY MODULE ASSEMBLY

(75) Inventors: Zoltan Horvath, Dunaujvaros (HU);
Pal Biegelbauer, Székesfehérvár (HU);
Tamas Vitalis, Szekesfehervar (HU);
Karoly Balazs, Szekesfehervar (HU);
Mihaly Soos, Szekefeshervar (HU);
Viktor Nyeste, Szekesfervar (HU);
Zsolt Kariko, Szekesfehervar (HU)

(73) Assignee: Ford Motor Company, Dearborn, MI (US)

( * ) Notice: Subject to any disclaimer, the term of this patent is extended or adjusted under 35 U.S.C. 154(b) by 203 days.

(21) Appl. No.: 11/046,177

(22) Filed: Jan. 28, 2005

(65) Prior Publication Data

US 2005/0183779 A1 Aug. 25, 2005

Related U.S. Application Data

(60) Provisional application No. 60/540,244, filed on Jan. 29, 2004.

(30) Foreign Application Priority Data

Dec. 17, 2004 (GB) .................................. 0427610.1

(51) Int. Cl.
*F02M 55/02* (2006.01)
(52) U.S. Cl. ...................................... 123/518; 123/519
(58) Field of Classification Search ............... 123/516, 123/518, 519, 520, 509
See application file for complete search history.

(56) References Cited

U.S. PATENT DOCUMENTS

| | | |
|---|---|---|
| 3,757,753 A | 9/1973 | Hunt |
| 4,598,686 A | 7/1986 | Lupoli et al. |
| 4,852,761 A | 8/1989 | Turner et al. |
| 4,919,103 A | 4/1990 | Ishiguro et al. |
| 5,038,741 A * | 8/1991 | Tuckey ........................ 123/509 |
| 5,050,567 A | 9/1991 | Suzuki |
| 5,056,494 A | 10/1991 | Kayanuma |
| 5,094,747 A | 3/1992 | Johnson |
| 5,146,901 A | 9/1992 | Jones |
| 5,170,765 A | 12/1992 | Hoshino et al. |
| 5,190,015 A | 3/1993 | Nakata et al. |
| 5,194,075 A | 3/1993 | Matsuoka |
| 5,263,458 A | 11/1993 | Fujino et al. |
| 5,456,236 A | 10/1995 | Wakashiro et al. |

(Continued)

FOREIGN PATENT DOCUMENTS

DE 19956582 C1 6/2001

(Continued)

*Primary Examiner*—Thomas Moulis
(74) *Attorney, Agent, or Firm*—Gregory P. Brown; MacMillan, Sobanski & Todd, LLC

(57) ABSTRACT

A fuel delivery module assembly for a vehicle which includes a fuel delivery module for supplying fuel from a fuel tank, a flange for attachment to a fuel tank and an emissions canister for controlling evaporative emissions. The fuel delivery module includes a reservoir for retaining fuel and a fuel pump for supplying fuel from the reservoir. The emissions canister is coupled to the fuel delivery module in a sliding relationship and is arranged such that the emissions canister can be displaced along a slide axis relative to the fuel delivery module between an installed position, in which the reservoir and emissions canister overlap parallel with the slide axis, and an installation position, in which the reservoir and emissions canister substantially do not overlap parallel with the slide axis. The invention also provides a fuel tank assembly comprising such a fuel delivery module assembly and to a method of positioning such a fuel delivery module assembly within a fuel tank.

16 Claims, 6 Drawing Sheets

U.S. PATENT DOCUMENTS

| | | |
|---|---|---|
| 5,460,136 A | 10/1995 | Yamazaki et al. |
| 5,647,328 A | 7/1997 | Fournier et al. |
| 5,647,329 A | 7/1997 | Bucci et al. |
| 5,704,337 A | 1/1998 | Stratz et al. |
| 5,762,049 A | 6/1998 | Jones et al. |
| 5,901,689 A | 5/1999 | Kimura et al. |
| 5,906,189 A | 5/1999 | Mukai et al. |
| 6,182,693 B1 | 2/2001 | Stack et al. |
| 6,213,100 B1 | 4/2001 | Johansen |
| 6,269,802 B1 | 8/2001 | Denis et al. |
| 6,273,070 B1 | 8/2001 | Arnal et al. |
| 6,302,144 B1 | 10/2001 | Graham et al. |
| 6,354,280 B1 | 3/2002 | Itakura et al. |
| 6,367,458 B1 | 4/2002 | Furusho et al. |
| 6,390,074 B1 | 5/2002 | Rothamel et al. |
| 6,463,915 B1 | 10/2002 | Ozaki et al. |
| 6,467,464 B1 | 10/2002 | Burke et al. |
| 6,491,180 B1 | 12/2002 | Distelhoff et al. |
| 6,527,008 B1 | 3/2003 | Meyer et al. |
| 2001/0050107 A1 | 12/2001 | Rudiger |
| 2005/0133096 A1* | 6/2005 | Brunel et al. .......... 137/565.17 |

FOREIGN PATENT DOCUMENTS

| | | |
|---|---|---|
| DE | 10133400 A1 | 2/2003 |
| EP | 0656470 A1 | 6/1995 |
| EP | 1160114 A2 | 4/2001 |
| EP | 1300274 A1 | 4/2002 |
| EP | 1285805 A1 | 8/2002 |
| EP | 1 452 724 A1 | 1/2004 |
| WO | WO01/34964 A1 | 5/2001 |

* cited by examiner

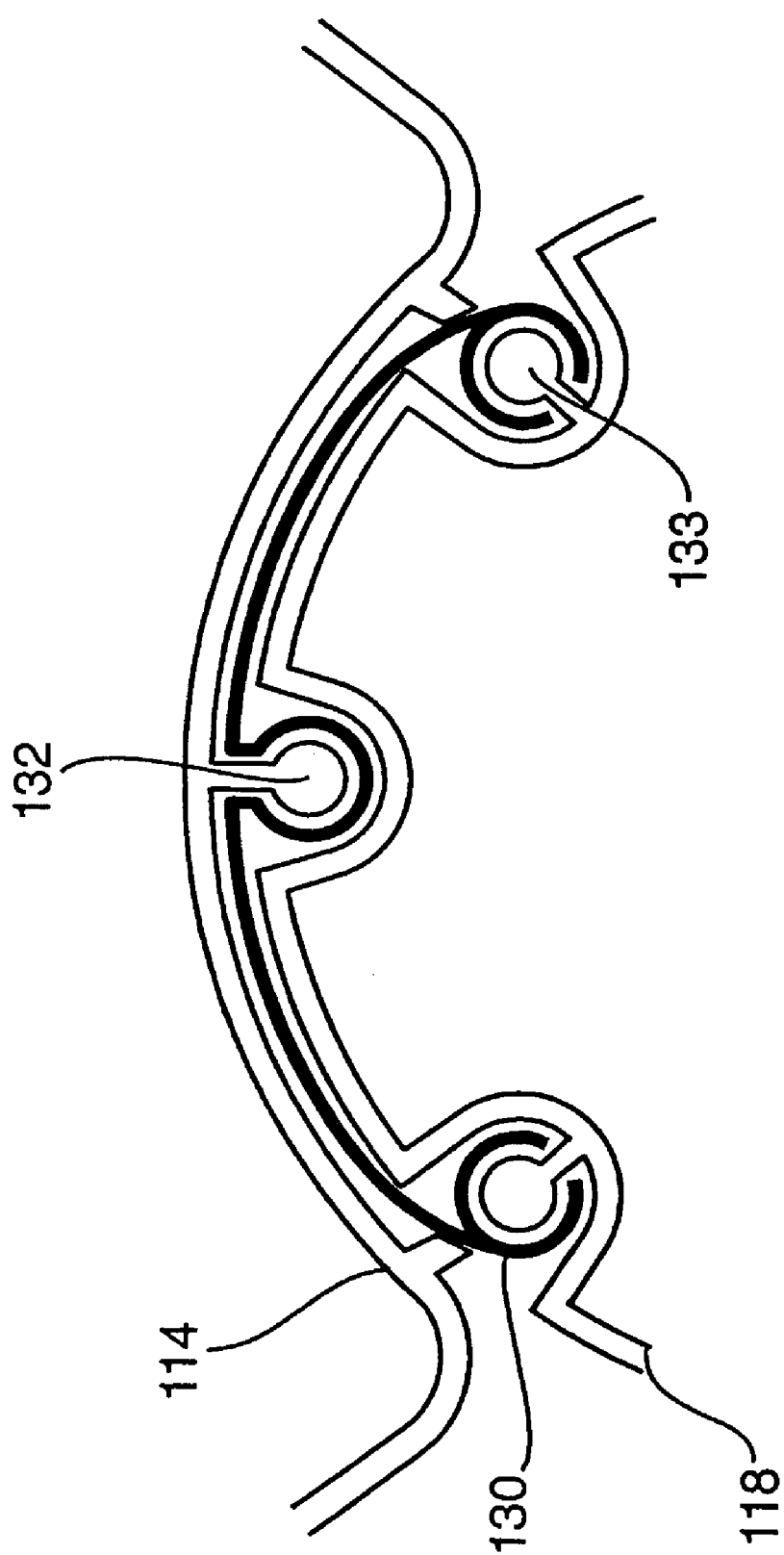

FUEL DELIVERY MODULE ASSEMBLY

CROSS-REFERENCE TO RELATED APPLICATIONS

This application claims, under 35 U.S.C. §119(e), the benefit of U.S. Provisional Patent Application Ser. No. 60/540,244 filed on Jan. 29, 2004.

BACKGROUND OF THE INVENTION

The present invention relates to a fuel delivery module assembly comprising both a fuel delivery module for supplying fuel and an emissions canister for controlling evaporative emissions, to a fuel tank assembly comprising such a fuel delivery module assembly and to a method of positioning the fuel delivery module assembly within a fuel tank.

It is well known to provide a fuel tank in a vehicle to store fuel which is to be used by an internal combustion engine of the vehicle. In order to comply with emissions regulations, vehicles may now include a vapor control system to reduce evaporative emissions from the fuel tank. Such systems typically include an emissions canister, such as a carbon canister, which is used to trap evaporative emissions from the fuel tank. The carbon canister is typically mounted remotely from the fuel tank. A carbon canister may, for example, be installed outside the fuel tank and operatively coupled to, for example, the venting system of the vehicle fuel tank and also to the air intake system of the vehicle. However, such remotely mounted systems may suffer from permeation losses through pipes and/or joints.

It has been suggested that the emissions canister could be located inside the fuel tank to reduce such permeation losses, but this can make fuel tank fabrication more difficult. Fitting the emissions canister inside the fuel tank can also require additional or larger apertures though which the components can pass into the fuel tank which increases the difficultly in reliably sealing the fuel tank.

It is an object of the present invention to provide a fuel delivery module assembly that addresses some of these problems.

BRIEF SUMMARY OF THE INVENTION

According to the invention there is provided a fuel delivery module assembly for a vehicle, the fuel delivery module assembly comprising a fuel delivery module for supplying fuel from a fuel tank, a flange for attachment to a fuel tank and an emissions canister for controlling evaporative emissions, the fuel delivery module comprising at least a reservoir for retaining fuel and a fuel pump for supplying fuel from the reservoir, the emissions canister being coupled to the fuel delivery module in a sliding relationship and being arranged such that the emissions canister can be displaced along a slide axis relative to the fuel delivery module between an installed position, in which the reservoir and emissions canister overlap parallel with the slide axis, and an installation position, in which the reservoir and emissions canister substantially do not overlap parallel with the slide axis, the flange being attached to a proximal component, the proximal component being one of the fuel delivery module and the emissions canister, the other being a distal component.

According to the invention there is further provided a method of positioning a fuel delivery module assembly within a vehicle fuel tank, the method comprising the steps of:

a) providing a fuel delivery module assembly comprising a fuel delivery module for supplying fuel from a fuel tank, a flange for attachment to a fuel tank, and an emissions canister for controlling evaporative emissions, the fuel delivery module comprising at least, a reservoir for retaining fuel and a fuel pump for supplying fuel from the reservoir, the emissions canister being coupled to the fuel delivery module in a sliding relationship and being arranged such that the emissions canister can be displaced along a slide axis relative to the fuel delivery module between an installed position, in which the reservoir and emissions canister overlap parallel with the slide axis, and an installation position, in which the reservoir and emissions canister substantially do not overlap parallel with the slide axis, the flange being attached to a proximal component, the proximal component being one of the fuel delivery module and the emissions canister, the other being a distal component;

b) providing a vehicle fuel tank having at least one aperture for receiving the fuel delivery module assembly, the aperture having a central axis;

c) arranging the fuel delivery module assembly in the installation position;

d) inserting the distal component through the aperture into the fuel tank;

e) displacing the distal component transversely away from the central axis of the aperture within the fuel tank; and f) inserting the proximal component into the fuel tank such that the distal component moves along the slide axis and the assembly attains an installed position.

According to the invention there is also provided a fuel tank assembly comprising a fuel tank having an aperture and a fuel delivery module assembly substantially as defined above, the flange of the fuel delivery module assembly contacting a periphery of the aperture in the fuel tank and being secured thereto such that the reservoir and emissions canister are retained within the fuel tank.

It should be understood that where it is stated that the reservoir and emissions canister substantially do not overlap parallel with the slide axis in the installation position, this is stated because this feature greatly facilitates the introduction of the fuel delivery module assembly into the fuel tank as the assembly will be substantially wider than the aperture in the fuel tank. As will readily be understood by a person skilled in the art, a small amount of overlap between the two components may be allowed while still achieving this advantage. However, it is likely to be more difficult to introduce the assembly into the fuel tank when the two components overlap. It is intended that this invention covers any embodiment with an amount of overlap between the components which achieves this stated advantage, i.e. the ability to introduce an assembly into a fuel tank via an aperture which is substantially narrower than the width of the fuel delivery module and emissions canister making up the assembly when they are placed side by side in the installed position.

The sliding relationship between the fuel delivery module and emissions canister ensures that both components of the fuel tank assembly can be introduced into the fuel tank through a single, relatively small aperture. As a result, there is minimal disruption to the surface of the fuel tank, thereby reducing the impact on the integrity of the structure. Also, the relatively small size of the aperture required to insert both components helps to improve seal integrity.

The emissions canister may be coupled in a sliding relationship to the fuel delivery module by a sliding joint.

The sliding joint may consist of any structure that generates a sliding relationship between the emissions canister and the fuel reservoir.

It is preferred that the reservoir of the fuel delivery module contacts, and remains in contact with a bottom surface of a fuel tank in which the fuel delivery module is to be mounted as this enables the reservoir to be in contact with fuel within the tank, even at low fuel levels. Preferably, the emissions canister is coupled to the reservoir by the sliding joint since the reservoir is likely to be the lowest component part of the fuel delivery module.

The sliding joint may comprise at least a first and a second guide member, the guide members co-operating to form the sliding joint.

The sliding joint may further comprise a sliding component that couples the first and second guide members such that the sliding joint is formed by at least three components.

It is preferred that the first guide member is attached to or forms part of the emissions canister and that the second guide member is attached to, or forms part of the fuel delivery module, preferably the reservoir. However, it should be understood that either guide member may instead be attached any other suitable part of the fuel delivery module assembly.

It is preferred that the proximal component, the distal component or both components are resiliently biased in a direction away from the flange. By biasing the components away from the flange, they are being biased towards an inner surface of the fuel tank. Once the fuel delivery module assembly is in position within the fuel tank, at least one of the components is preferably in contact with an inner surface of the fuel tank such that it is secured against said inner surface of the fuel tank. The inner surface of the tank with which the component is in contact will preferably be the bottom surface of the tank. Securing the component within the fuel tank ensures that it is substantially prevented from moving around inside the fuel tank when the vehicle is in use. The biasing may be achieved by a spring or other biasing means which may be located between the flange and the distal component. The component secured may be either the fuel delivery module or the emissions canister. If one component is not forced onto an inner surface of the fuel tank, it is preferred that the nature of the sliding joint is such that the movement of that component is substantially restricted by the other.

Preferably, the flange is attached to the fuel delivery module. However, irrespective of which component the flange is attached to within the assembly, the flange may further include a guide rod for interacting with and maintaining the correct positioning of the biasing means, particularly when the biasing means is a spring.

The fuel delivery module assembly may also include a level sensing device for use in determining a level of fuel within a fuel tank. The level sensing device is preferably a pivotal float arm which includes means for indicating an angle of the float arm. It is desirable to have a level sensing device within the fuel tank so that the fuel level within the fuel tank can be monitored. It is preferable to have the device mounted on the fuel delivery module assembly so that it can be inserted into the fuel tank via the same aperture. This reduces the number of apertures in the fuel tank thereby minimizing the risk of emissions permeation losses via seals around the apertures.

It is preferred that the level sensing device is attached to the distal component as this provides some flexibility regarding the positioning of the level sensing device relative to the aperture in the fuel tank. Since the distal component is displaced away from the central axis of the aperture during fuel tank construction, the direction of the displacement can be used to position the level sensing device advantageously. It is often preferable to have the level sensing device located centrally within a fuel tank.

The fuel delivery module assembly may further comprise an extendable rod extending between the flange and the distal component. This rod provides extra stability to the sliding relationship between the fuel delivery module and the emissions canister. If such a rod is used, it is preferred that the distal component is resiliently biased away from the flange by a compression spring surrounding at least part of the extendable rod. This also assists in maintaining the distal component in a stable position within the fuel tank.

By providing such an assembly, a standardized fuel tank can be used in a vehicle for a range of engine sizes. The fuel tank can have an aperture that is sized to permit a standardized fuel delivery module to enter the fuel tank and an emissions canister of a suitable size for the engine size and vehicle use can be attached to the fuel delivery module without the need for the aperture to be enlarged or otherwise altered. It is desirable to have standard car parts across entire car model ranges as this reduces costs. The size of the fuel pump and the size of the emissions canister required may depend on the size of the engine of a car. Using the present invention, the size of these two components can be readily altered without affecting the size of the fuel delivery module or the size of the aperture required in the fuel tank. The aperture and fuel delivery module can both therefore remain a standard size, thereby reducing the overall cost of the car.

It is preferred that components forming the sliding joint will be capable of being snap-fitted together so that alternative sizes of components can be easily mounted onto one another. In particular, alternative sizes of emissions canisters may be easily mounted onto a universal fuel delivery module. In addition, as the emissions canister and the fuel delivery module sit side by side within the vehicle fuel tank such that the reservoir and emissions canister overlap parallel with the slide axis, the two components can be inserted into a relatively shallow fuel tank.

BRIEF DESCRIPTION OF THE DRAWINGS

The invention will now be further described, by way of example only and with reference to the accompanying drawings, in which:

FIG. 6 is a cross-section through a sliding joint between the emissions canister and the fuel delivery module according to the embodiment as shown in FIG. 5, when the fuel delivery module assembly is in the installed position.

DETAILED DESCRIPTION OF THE INVENTION

Figure 1:
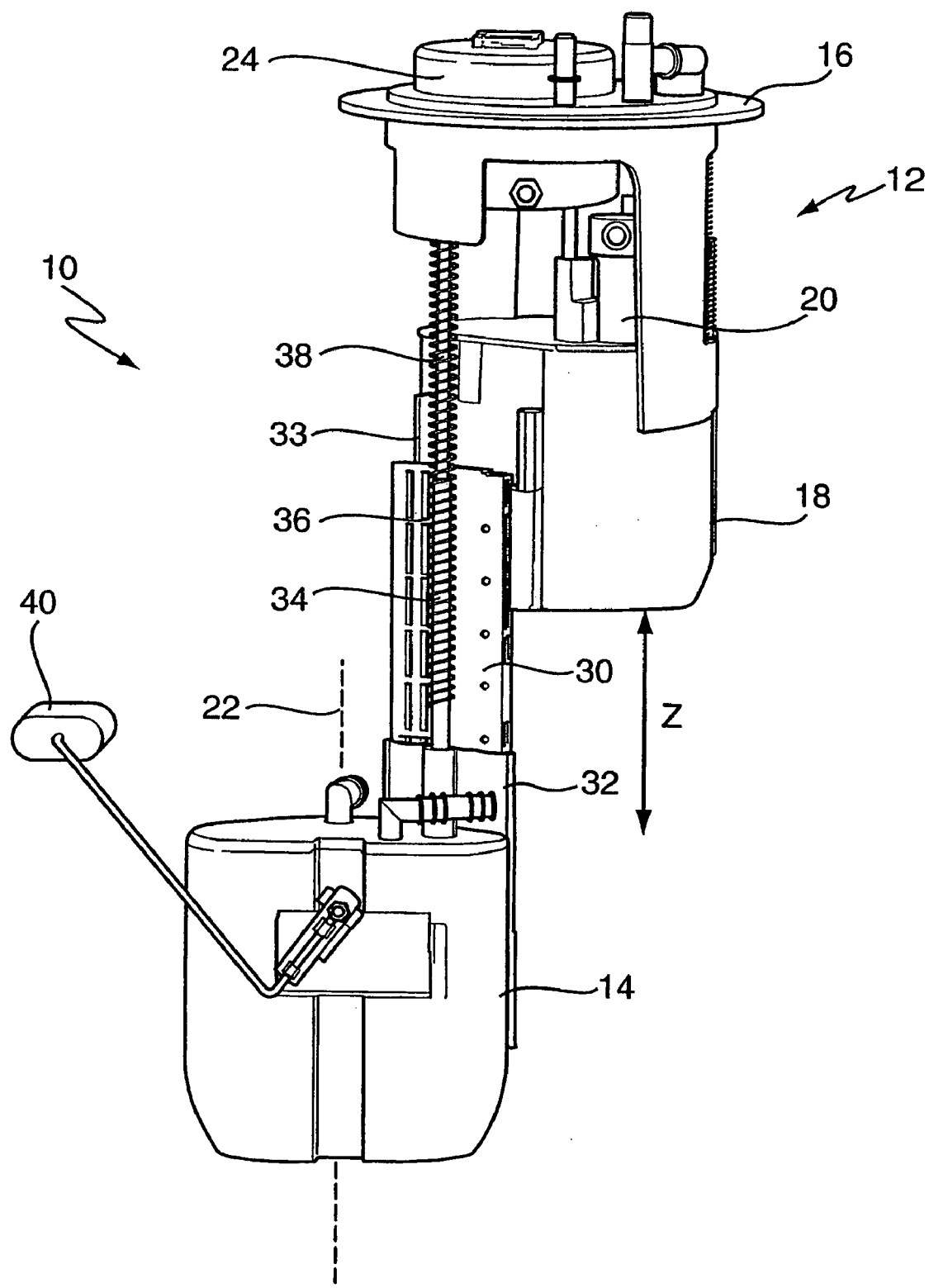
FIG. 1 is a schematic diagram of a fuel delivery module assembly.

FIG. 1 is a schematic diagram of a fuel delivery module assembly 10 for a vehicle in an installation position. The fuel delivery module assembly 10 comprises a fuel delivery module 12 for supplying fuel from a fuel tank, a flange 16 for attachment to a fuel tank and an emissions canister 14 for controlling evaporative emissions from a fuel tank. The fuel delivery module 12 comprises a reservoir 18 for retaining fuel and a fuel pump 20 for supplying fuel from the reservoir 18. The flange 16 is coupled to a proximal component, in this case the fuel delivery module 12, which is coupled to a distal component, in this case the emissions canister 14.

The emissions canister 14 is coupled to the fuel delivery module 12 in a sliding relationship and is arranged such that the emissions canister 14 can be displaced relative to the fuel delivery module 12 away from or towards the flange 16 along a slide axis 22. The fuel delivery module assembly 10 further comprises an integrated life time filter 24, a two-way check valve 26 (shown in FIG. 2) and a cut-off valve 28 (also shown in FIG. 2). The fuel delivery module assembly 10 may further comprise a pressure regulator and a roll-over valve (not shown).

As stated above, the emissions canister 14 is coupled in a sliding relationship to the fuel delivery module 12. This is achieved by the use of a sliding joint (shown in more detail in FIG. 4). More specifically, the emissions canister 14 is coupled to the fuel reservoir 18 of the fuel delivery module 12 by the sliding joint. The sliding joint comprises at least a first and a second guide member. In this case, tracks 32, 33 (best shown in FIG. 4) act as the guide members. There is also a sliding component 30 which slides between the tracks 32, 33 and couples the two sets of tracks which form the guide members. The assembly 10 further includes an extendable rod 34 which includes rods 36, 38, the rods 36, 38 act as guide members and slide over one another to form the extendable rod 34. The sliding joint creating the sliding relationship between the fuel delivery module 18 and emissions canister 14 is therefore formed by a combination of the tracks 32, 33 and the sliding component 30.

Track 32 which forms the first guide member is attached to or forms part of the emissions canister and track 33 forming the second guide member is attached to, or forms part of the fuel delivery module. The sliding component 30 includes stops (not shown) preventing it from sliding too far along the tracks 32, 33 thereby preventing it from losing contact with them. The stops may be formed by any suitable means of achieving this.

The fuel delivery module assembly 10 further includes a level sensing device for use in determining a level of fuel within the vehicle fuel tank. Preferably, the level sensing device is formed by a pivotal float arm 40 and is attached to the emissions canister 14. In this case, the fuel delivery module 12 is to be mounted offset from a centerline of a fuel tank. The level sensing device, in this case the pivotal float arm 40, is displaced from the fuel delivery module 12 as it is mounted to the emissions canister 14 and can therefore be mounted substantially centrally within the fuel tank. The fuel delivery module assembly 10 is shown in FIG. 1 in an installation position in which the emissions canister 14 has been displaced along a slide axis 22 relative to the fuel delivery module 12 such that the reservoir 18 and emissions canister 14 substantially do not overlap parallel with the slide axis 22. This displacement results in a gap z between the reservoir 18 and canister 14 parallel with the slide axis. In this case, the emissions canister 14 has been displaced in a direction away from the flange 16 along the slide axis 22, the flange being attached to the fuel delivery module 12.

Figure 2:
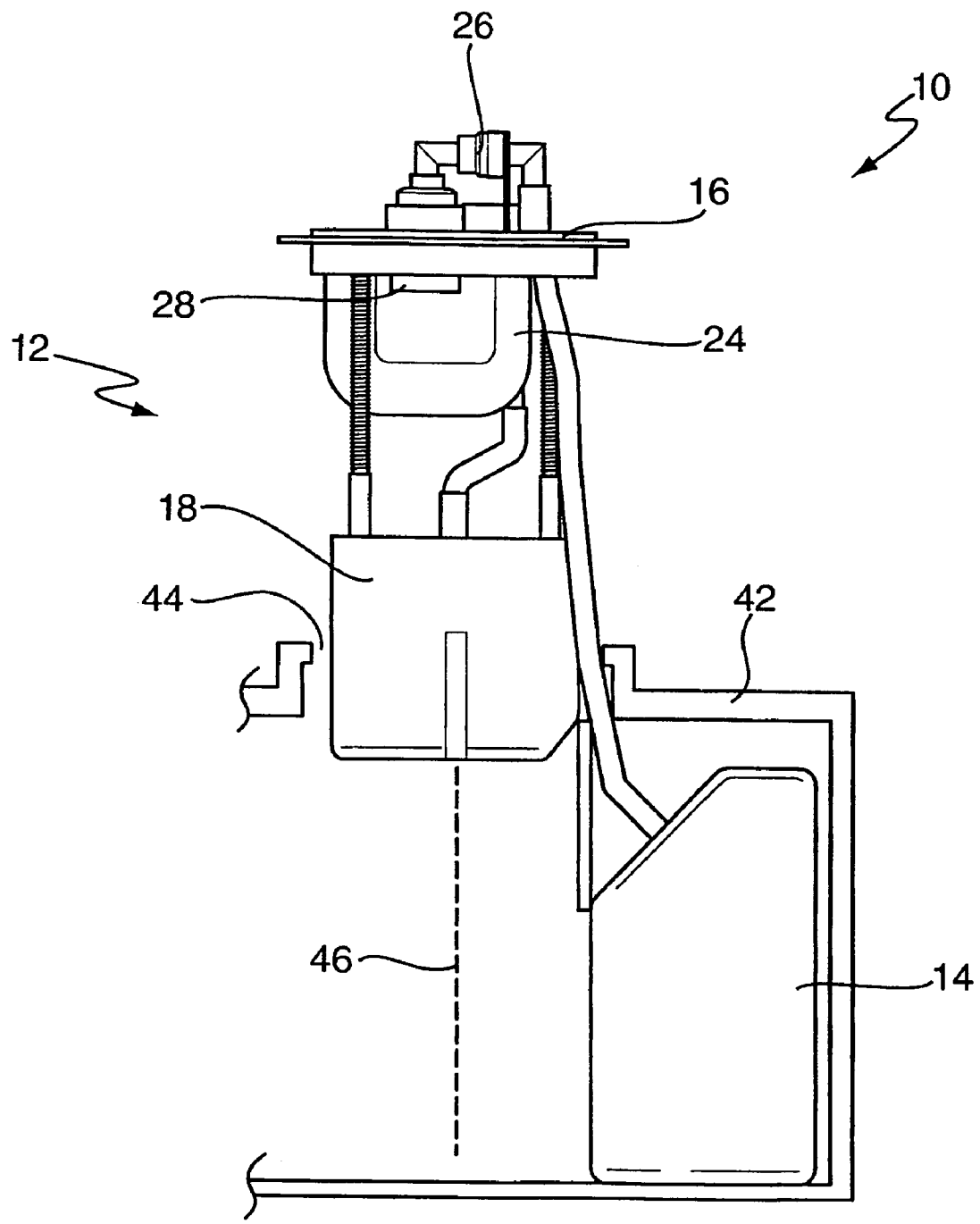
FIG. 2 is a schematic diagram of a fuel delivery module assembly being inserted into a vehicle fuel tank in an installation position.

FIG. 2 shows a vehicle fuel tank 42 receiving the fuel delivery module assembly 10 via an aperture 44 in the tank 42, the aperture 44 having a central axis 46. The fuel delivery module assembly 10 is in the installation position and the emissions canister 14 and has been inserted through the aperture 44 into the fuel tank 42 substantially parallel to the central axis 46 of the aperture 44. The emissions canister 14 has then been displaced transversely away from the central axis 46 within the fuel tank 42 such that it is no longer in register with the aperture 44 and such that the fuel delivery module 12 moves into register with the aperture 44 so that it too can pass through. The emissions canister 14 has a dimension running parallel to a plane of the flange 16. For the purposes of describing this invention, this dimension will be referred to as a width of the emissions canister 14. The flange 16 also has a width, which in this case is the diameter of the flange since the flange 16 is substantially circular.

Figure 3:
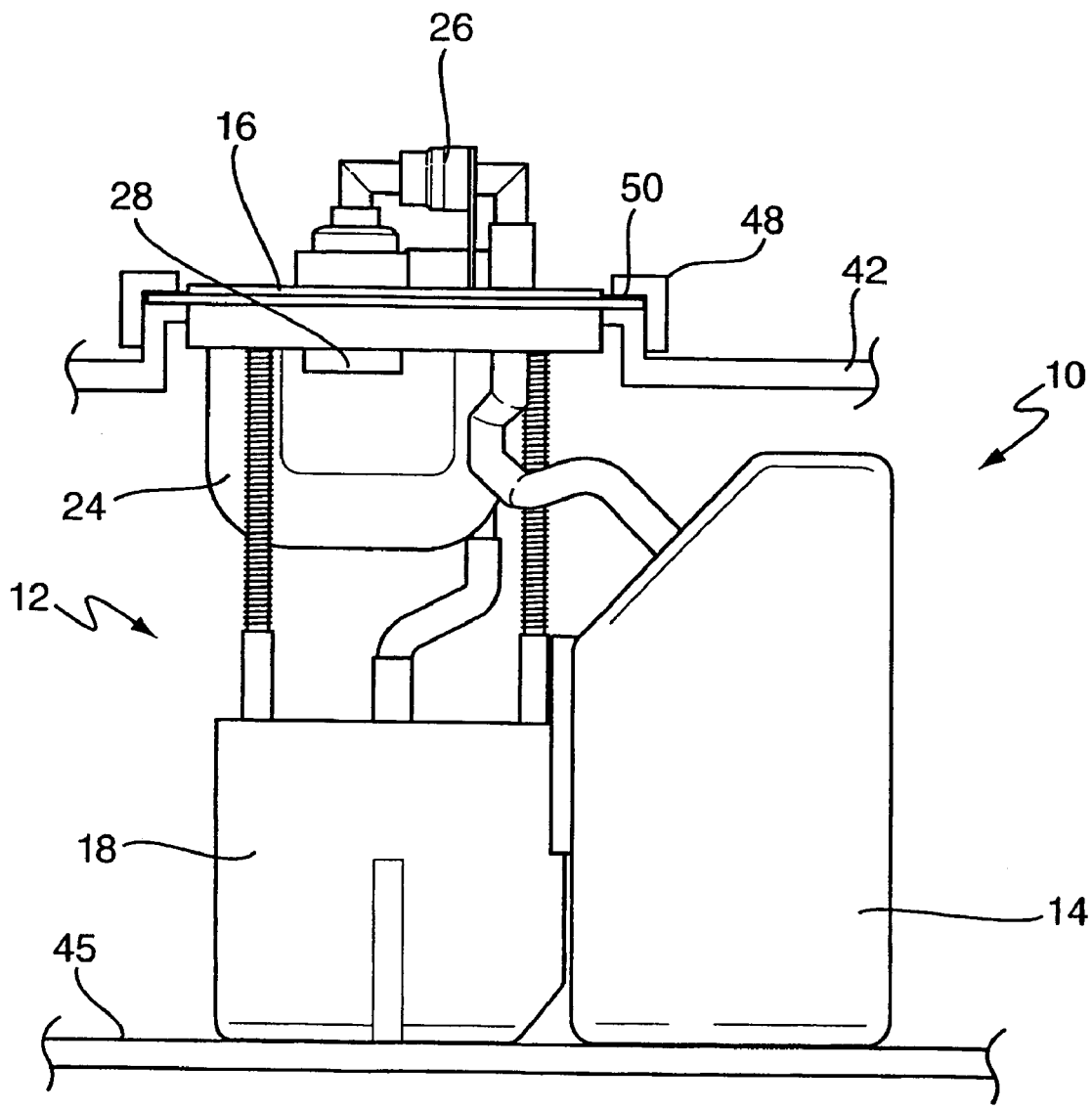
FIG. 3 is a schematic diagram of a fuel delivery module assembly located within a vehicle fuel tank in an installed position.

FIG. 3 shows the fuel delivery module 12 having also been inserted into the fuel tank 42 such that the emissions canister 14 has returned along the slide axis 22 towards the flange 16. The fuel delivery module assembly 10 is now in the installed position in which the reservoir 18 and emissions canister 14 overlap parallel with the slide axis 22 and the entire fuel delivery module assembly 10 is substantially contained within the fuel tank 42, the flange 16 remaining just outside the fuel tank 42. The reservoir 18 and the emissions canister 14 are sitting side by side inside the vehicle fuel tank 42 and are in contact with a bottom 45 of the fuel tank 42. It should be noted that the emissions canister 14 projects beyond a width of the flange 16 such that at least 25% of the width of the canister 14 projects beyond the width of the flange 16. Preferably, up to 50% of the canister's width may project beyond the width of the flange 16 and more preferably up to 70% of the canister's width may project beyond the flange 16.

FIG. 3 also shows a retaining member 48 which screws down over the flange 16 of the fuel delivery module assembly 10, onto a rim of the fuel tank 42 thereby holding the assembly 10 in place within the fuel tank 42. The retaining member 48 may be any means of retaining the fuel delivery module assembly 10 within the fuel tank 42. For example, it may be a screw ring or a plurality of bolts or screws. There is additionally a sealing member 50 located between the retaining member 48 and the flange 16. This serves to seal the joint between the flange 16 and the retaining member 48 and may be formed by any sealing means such as a rubber sealing washer.

Figure 4:
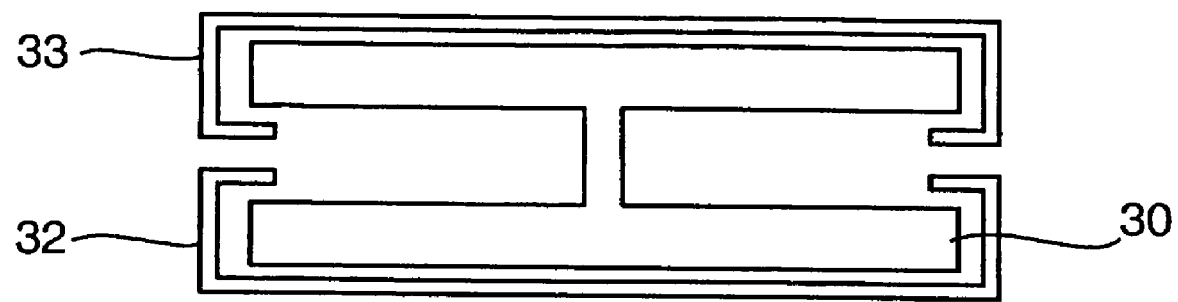
FIG. 4 is a detailed view of a sliding joint which may provide a sliding relationship between an emissions canister and a fuel delivery module.

FIG. 4 is a detailed view of the sliding joint of FIG. 1 in which there are two guide members formed by tracks 32, 33 and a sliding component 30 which lies between them. The sliding component 30 consists of an I-shaped piece of plastic which runs along and between the tracks 32, 33. As mentioned above, track 32 forms the first guide member and is attached to or forms part of the emissions canister 14 and track 33 forms the second guide member and is attached to, or forms part of the fuel delivery module 12.

Figure 5:
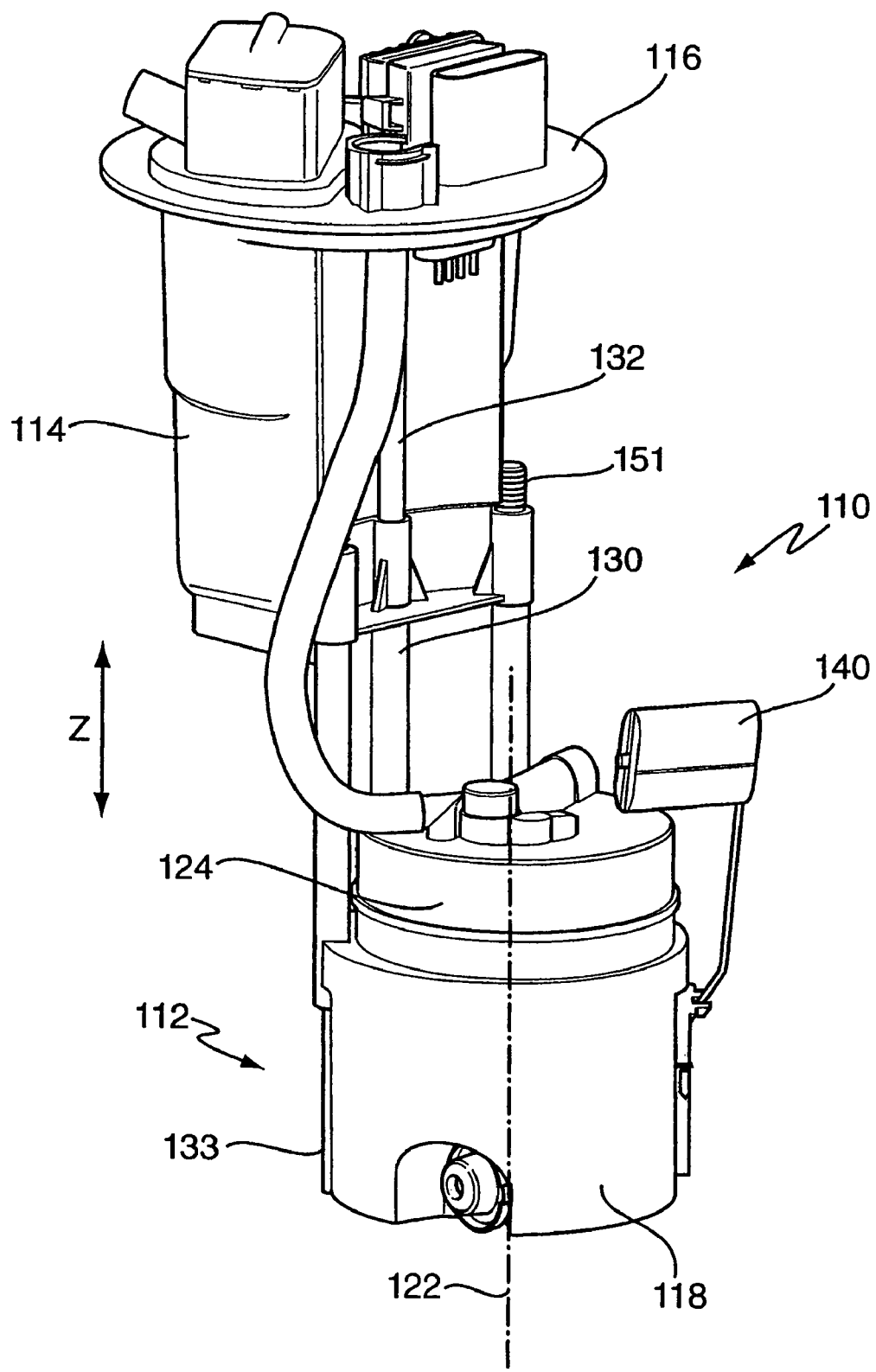
FIG. 5 is a schematic diagram of an alternative embodiment of a fuel delivery module assembly.

FIG. 5 shows an alternative arrangement of a fuel delivery module assembly 110. Features having the same function as those shown in FIGS. 1 to 4 will be given the same reference numerals but incremented by 100. The differing features will now be discussed in more detail.

In this arrangement, it is the emissions canister 114 that forms the proximal component and the fuel delivery module 112 that forms the distal component. In this embodiment, it would therefore be the fuel delivery module 112 that would be inserted into the aperture 44 in the fuel tank 42 first. The pivotal float arm 140 which forms the level sensing device is instead mounted on the fuel delivery module 118, as is the integrated life-time filter 124. FIG. 5 shows the fuel delivery module assembly in the installation position such that the reservoir 118 and emissions canister 114 substantially do not overlap parallel with the slide axis 122.

In this embodiment, the sliding joint also has an alternative construction as shown in more detail in FIG. 6. FIG. 5 shows that tracks 133 are attached to or form part of the fuel delivery module 112 and tracks 132 are attached to or form part of the emissions canister 114. A sliding component 130 slides between the two sets of tracks 133, 132 and couples them together to form the sliding joint and therefore the sliding relationship between the emissions canister 114 and the fuel delivery module 112. There is also a compression spring 151 mounted on an end of the sliding component 130 nearest the flange 116 which acts as the biasing means and ensures that the distal component, in this case, the fuel delivery module 112, maintains contact with the bottom 45 of the fuel tank 42 (not shown). Thus, when the fuel delivery module assembly 110 is in the installed position within the fuel tank 42, the compression spring 150 will make contact with an underside of the flange 116 to bias the fuel delivery module 112 towards the bottom 45 of the fuel tank 42 (not shown).

FIG. 6 shows a cross-section of the sliding joint of FIG. 5 when the assembly 110 is in the installed position. In cross-section, the tracks 132 and 133 consist of substantially bulb-shaped heads on stalks. The sliding component 130 is molded so that it is complementary in shape to the tracks 132, 133 and therefore fits round them. All three components of this embodiment of the sliding joint are complementary in shape so that they fit around one another and can slide smoothly past one another. It is preferred that the tracks 132, 133 and the sliding component 130 are made of a plastics material.

While the present invention has been described with reference to specific embodiments, it should be understood that modifications and variations of the invention may be constructed without departing from the scope of the invention as defined in the following claims.

The invention claimed is:

1. A fuel delivery module assembly for a vehicle, the fuel delivery module assembly comprising a fuel delivery module for supplying fuel from a fuel tank, a flange for attachment to a fuel tank and an emissions canister for controlling evaporative emissions, the fuel delivery module comprising at least a reservoir for retaining fuel and a fuel pump for supplying fuel from the reservoir, the emissions canister being coupled to the fuel delivery module in a sliding relationship and being arranged such that the emissions canister can be displaced along a slide axis relative to the fuel delivery module between an installed position, in which the reservoir and emissions canister overlap parallel with the slide axis, and an installation position, in which the reservoir and emissions canister substantially do not overlap parallel with the slide axis, the flange being attached to a proximal component, the proximal component being one of the fuel delivery module and the emissions canister, the other being a distal component.

2. A fuel delivery module assembly according to claim 1, wherein the emissions canister is coupled in a sliding relationship to the fuel delivery module by a sliding joint.

3. A fuel delivery module assembly according to claim 2, wherein the emissions canister is coupled to the reservoir by the sliding joint.

4. A fuel delivery module assembly according to claim 2, wherein the sliding joint comprises at least a first and second guide member, the guide members co-operating to form the sliding joint.

5. A fuel delivery module assembly according claim 4, wherein the sliding joint further comprises a sliding component that couples the first and second guide members.

6. A fuel delivery module assembly according to claim 4, wherein the first guide member is attached to or forms part of the emissions canister and the second guide member is attached to, or forms part of the fuel delivery module.

7. A fuel delivery module assembly according to claim 1, in which the distal component is resiliently biased in a direction away from the flange.

8. A fuel delivery module assembly according to claim 1, in which the flange is attached to the fuel delivery module.

9. A fuel delivery module assembly as claimed in claim 7, further comprising a level sensing device for use in determining a level of fuel within a fuel tank.

10. A fuel delivery module assembly as claimed in claim 8, wherein the level sensing device is a pivotal float arm.

11. A fuel delivery module assembly according to claim 7, wherein the level sensing device is attached to the emissions canister.

12. A fuel delivery module assembly according to any of claim 8, wherein the emissions canister is resiliently biased in a direction away from the flange.

13. A fuel delivery module assembly according to any of claim 8, further comprising an extendable rod extending between the flange and the emissions canister.

14. A fuel delivery module assembly according to claim 13, wherein the emissions canister is resiliently biased away from the flange by a compression spring surrounding at least part of the extendable rod.

15. A fuel tank assembly comprising a fuel tank having an aperture and a fuel delivery module assembly as defined in claim 1, the flange of the fuel delivery module assembly contacting a periphery of an aperture in the fuel tank and being secured thereto such that the reservoir and emissions canister are retained within the fuel tank.

16. A method of positioning a fuel delivery module assembly within a vehicle fuel tank, the method comprising the steps of:

a) providing a fuel delivery module assembly comprising a fuel delivery module for supplying fuel from a fuel tank, a flange for attachment to a fuel tank, and an emissions canister for controlling evaporative emissions, the fuel delivery module comprising at least, a reservoir for retaining fuel and a fuel pump for supplying fuel from the reservoir, the emissions canister being coupled to the fuel delivery module in a sliding relationship and being arranged such that the emissions canister can be displaced along a slide axis relative to the fuel delivery module between an installed position, in which the reservoir and emissions canister overlap parallel with the slide axis, and an installation position, in which the reservoir and emissions canister substantially do not overlap parallel with the slide axis, the flange being attached to a proximal component, the proximal component being one of the fuel delivery module and the emissions canister, the other being a distal component;

b) providing a vehicle fuel tank having at least one aperture for receiving the fuel delivery module assembly, the aperture having a central axis;

c) arranging the fuel delivery module assembly in the installation position;

d) inserting the distal component through the aperture into the fuel tank;

e) displacing the distal component transversely away from the central axis of the aperture within the fuel tank; and f) inserting the proximal component into the fuel tank such that the distal component moves along the slide axis and the assembly attains an installed position.

* * * * *